Feb. 10, 1931.    J. A. DEMPSTER    1,792,288
ELASTIC FLUID MACHINE
Filed April 24, 1929

Inventor:
John A. Dempster,
by Charles E. Tulla
His Attorney.

Patented Feb. 10, 1931

1,792,288

UNITED STATES PATENT OFFICE

JOHN A. DEMPSTER, OF SCHENECTADY, NEW YORK, ASSIGNOR TO GENERAL ELECTRIC COMPANY, A CORPORATION OF NEW YORK

ELASTIC-FLUID MACHINE

Application filed April 24, 1929. Serial No. 357,832.

The present invention relates to elastic fluid turbines and particularly to an improved structure and arrangement for attaching diaphragm packings to a turbine shaft.

This invention is particularly applicable to turbine rotors having wheels or discs integral with the shafts although the invention is not limited thereto. Due to the fact that the discs are integral with the shafts it is impossible to assemble solid packing rings on the shaft by slipping them over the end of the shaft in the usual manner. The inherent difficulty in the case of assembling composite packing rings lies in fastening the same to the rotor. The present invention is directed to an improved structure of the packing elements and shafts whereby these elements may be assembled and fastened in a satisfactory manner.

For a consideration of what I believe to be novel and my invention, attention is directed to the accompanying description and the claims appended thereto.

Figure 1:
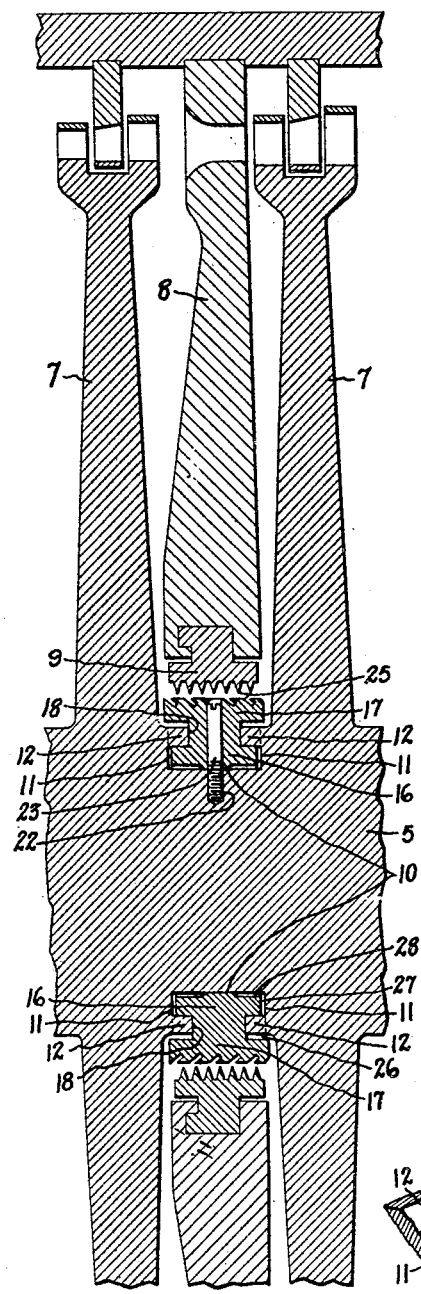
Figure 2:
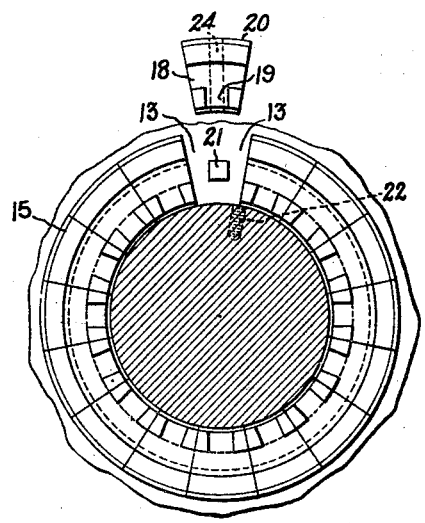
Figure 3:
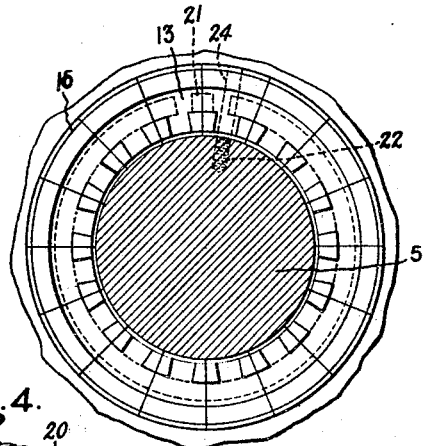
Figure 4:
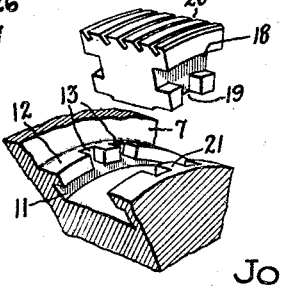

In the drawing, Fig. 1 is a central sectional view of a turbine rotor and stator with packing according to my invention applied to the rotor. Figs. 2 and 3 are end views of packing as applied to the turbine shaft, the latter being shown in section. Fig. 4 is a detail perspective view of a packing element and a part of the turbine rotor.

Referring to the drawing, 5 indicates a turbine shaft or rotor having integral discs or bucket carrying wheels 7. In Fig. 1 a diaphragm 8 is shown disposed between adjacent wheels and carrying a packing annulus 9.

According to my invention I provide an annular T-shaped dovetail slot 10 on the circumference of the shaft 5, thus forming apposed under-cut grooves 11, located a suitable distance from the top of slot 10, and annular flanges 12. Radial passages 13 cut away each flange 12 at two spaced points as illustrated in Figs. 2 and 3. A packing annulus or ring 15 of composite nature has an inverted T-shaped dovetail portion 16 and a face portion 17. Annular grooves 18 are cut in the sides of ring 15 and radial, equally spaced passages 19 extend from grooves 18 through the flanges of the dovetail portion 16. The width of each passage 19 is made equal to the distance between adjacent passages 13. For the purpose of assembly on shaft 5, the ring 15 is divided into similar sectors 20 with radial divisions occurring midway between adjacent passages 19. The passages 13 in the flanges 12 abovementioned are spaced so that the distance between their outside margins is equal to the length of the annular groove 18 of a single sector. The portion of each flange 12 between the passages 13 forms a lug, designated 21 in Figs. 2 and 3 which is reduced in circumferential length to slightly less than the length of passages 19 so that each sector 20 may slide radially into place then circumferentially to engage the dovetail portion 16 with the flanges 12. A hole 22 is drilled radially in shaft 5, the center of said hole being in alignment with the margins of the flanges 12 and the adjacent slots 13. The hole 22 is threaded to receive a threaded pin 23. One sector 20 has a hole 24 cut midway of its annular length and in alignment with the hole 22. A sufficient number of sectors 20 are assembled to form a complete annulus then all are moved circumferentially until the holes 22 and 24 register. The pin 23, threaded at its end, is turned into member 5 until it lies below the surface of face portion 17. The metal adjacent the hole 24 is then peened over the pin to lock it in position. The ring 15 is thus held from radial movement by flanges 12 and from circumferential movement by pin 23.

In connection with turbines of this type the packing ring 15 on the shaft cooperates with the packing member 9 carried by the diaphragm 8 to prevent leakage between the bore of the diaphragm and the shaft. To properly prevent leakage the packings have to be spaced with such a small clearance that a disturbance of the rotor 5 may cause rubbing. This necessitates some provision for dissipating the heat produced by rubbing before the shaft becomes heated sufficiently to cause bowing of the same. To this end, teeth 25 are cut in the adjacent faces of packing members 9 and 15 to increase the surface area of the bearing faces in contact with the steam in the turbine. The sectors 20 are also provided with clearance spaces 26 between the face portions 17 and the flanges 12 and clearance spaces 27 and 28 at the sides and base of the dovetail portion 16 as shown in Fig. 1. These clearance spaces are provided to reduce the area of contact between the sectors and the rotor so that the major portion of the heat produced, in case rubbing occurs, will be dissipated to the steam by convection rather than be conducted to the rotor.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In an elastic fluid turbine, a rotor having an annular dovetailed slot cut therein forming flanges on the rotor, said flanges being each provided with radially extending slots providing a lug between the slots, a packing ring comprising sectors having dovetailed bases forming flanges thereon, said flanges being of a length to pass through said slots and being provided with slots of a width to permit of the passage of said lugs therethrough, whereby when the ring of sectors has been assembled in said rotor slot, said ring may be turned as a whole to bring a sector flange under said lug.

2. In an elastic fluid turbine, a rotor having an annular dovetailed cut therein forming flanges on the rotor, said flanges being each provided with radially extending slots providing a lug between the slots, a packing ring comprising sectors having dovetailed bases forming flanges thereon, said flanges being of a length to pass through said slots and being provided with slots of a width to permit of the passage of said lugs therethrough, whereby when the ring of sectors has been assembled in said slot, said ring may be turned as a whole to bring a sector flange under said lug, and means to lock said packing ring in place when a sector flange is under said slot lug.

In witness whereof I have hereunto set my hand this 23rd day of April, 1929.

JOHN A. DEMPSTER.